United States Patent [19]

Escarabajal et al.

[11] Patent Number: 4,515,249

[45] Date of Patent: May 7, 1985

[54] SPRING FOR PADS OF A DISC BRAKE WITH A SLIDING CALLIPER, AND DISC BRAKE EQUIPPED WITH SUCH A SPRING

[75] Inventors: Gislain Escarabajal, Clichy s/Bois; Jean-Charles Maligne, Aubervilliers, both of France

[73] Assignee: Societe Anonyme D.B.A., Paris, France

[21] Appl. No.: 512,826

[22] Filed: Jul. 11, 1983

[30] Foreign Application Priority Data

Jul. 22, 1982 [FR] France .................. 82 12805

[51] Int. Cl.³ ............................ F16D 65/02
[52] U.S. Cl. ................................ 188/73.38
[58] Field of Search ............ 188/73.31, 73.35, 73.36, 188/73.37, 73.38, 73.44

[56] References Cited

U.S. PATENT DOCUMENTS

| 3,677,373 | 7/1972 | Lucien | 188/73.38 X |
| 4,061,209 | 12/1977 | Gee et al. | 188/73.3 |
| 4,428,463 | 1/1984 | Burgdorf et al. | 188/73.38 |
| 4,463,837 | 8/1984 | Courbot | 188/73.38 |

FOREIGN PATENT DOCUMENTS 2199828 4/1974 France .
2221028 10/1974 France .

Primary Examiner—Duane A. Reger
Attorney, Agent, or Firm—Larry J. Palguta; Ken C. Decker

[57] ABSTRACT

The spring (1), for a disc brake of the type incorporating a calliper (10) sliding on a fixed support (12) and two friction pads (18) anchored and able to slide axially in an opening of the fixed support and the calliper incorporating an arched portion (25) having an opening (26) passing through, incorporates two hoops (2) each extended by first (3) and second (4) feet cooperating with seats formed on the inner face of the arch (25) of the calliper, the first feet (3) being joined to one another by a tiebar (6) connected to the first feet by loops (7) and bearing against an angled seat defined on the upper edge of the pads (18) by a central projection (30) on the latter. The spring (1), made advantageously of stainless steel wire, pushes elastically the friction pads tangentially and radially towards the axis of the disc.

13 Claims, 6 Drawing Figures

SPRING FOR PADS OF A DISC BRAKE WITH A SLIDING CALLIPER, AND DISC BRAKE EQUIPPED WITH SUCH A SPRING

The invention concerns springs for the pads of disc brakes, and more particularly, a spring for the pads of a disc brake of the type incorporating a calliper mounted so as to slide on a fixed support and incorporating an arched portion having, vertically above two friction brake pads, an opening passing through, the spring being intended to be interposed between the arched portion of the calliper and the friction pads so as to exert on the latter at least a radial force directed essentially towards the axis of the disc, to push the friction pads against seats formed in the brake component (fixed support or calliper) in which these pads are anchored.

More specifically, the present invention concerns such a pad spring incorporating a central portion, arranged to be entered into the opening in the calliper arch, extended by lateral portions capable of cooperating with the inner face of the arch for elastic mounting of the spring on the calliper, together with a bearing portion cooperating in the operating position of the brake, with the upper edges of the friction pads.

Such a spring is described in German Patent Application No. 2,345,733. The spring described in this document, made from an elastic metallic sheet, incorporates a central web from which short mounting feet project into the opening through the calliper arch, together with pairs of extended feet, at right angles to the previous feet, extending along the inside face of the arch to maintain elastically the spring on the calliper. In the operating position, the central web of the spring comes to bear upon the upper edge of the pads by deforming the extended pairs of feet which provide the force pushing against the pads. A spring of this type, of relatively bulky design, requires a large housing to be arranged in the inside face of the calliper arch to accept the corresponding pairs of feet, as well as a space in the central web to allow the pads to be checked visually and to allow improved dissipation of the heat given off during braking operations.

French Patent Application No. 2,479,381 describes a simplified spring construction in sheet wire in the shape of a letter Z bearing against a recess formed in the inside face of the calliper arch.

An object of the present invention is to propose a spring for brake pads of the type mentioned above, of simple construction, of low manufacturing cost, occupying only a small space between the arch and the friction pads and able to provide a high radial pushing force on the latter.

To achieve this, according to a feature of the invention, the spring is shaped to take the form of two parallel hoops each essentially in the shape of a letter C constituting the central portion of the spring, the ends of each hoop being extended by first and second feet folded angularly in the same direction relative to the plane of the hoop, the feet of the two hoops extending in opposite directions and constituting the lateral portions of the spring, the first feet of the hoops being joined to one another by a tiebar extending perpendicular to the planes of the hoops and constituting the bearing portion of the spring coming into contact engagement with the upper edges of the friction pads.

In the types of disc brake mentioned above, notably in disc brakes in which the calliper is mounted so as to slide relative to the fixed support by means of a single axial pin and by means of two slide surfaces formed facing one another in the end of the calliper opposite the pin and in the fixed support, it is desirable to apply to the friction pads a permanent tangential force pushing the latter so as to bear against the component (calliper or fixed support) relative to which they are anchored and able to slide axially.

French Pat. No. 2,009,993 describes a single spring provided for this purpose mounted upon at least one of the axial pins for guiding the pads in a brake with a flat calliper.

British Pat. No. 2,056,601 describes a leaf spring incorporating a profiled central web and four lateral elastic arms which ensure that the spring is maintained elastically in a closed cavity in the calliper arch, the central web bearing, under operating conditions, against the upper edge of the pads and a lateral edge of a projection of these same pads.

French Patent Application No. 81-03,268 describes, for its part, a leaf spring mounted in the opening passing through the calliper arch and incorporating two V-shaped portions buttressed against one of the faces of the opening and against the inside face of the calliper arch, the apex of the V bearing against an angle formed by a projecting portion of the upper edge of the friction pads.

Another object of the present invention is to propose a spring of the type described above, of simple and robust construction and occupying little space, also enabling a permanent tangential force to be applied onto the friction pads.

To achieve this, according to a feature of the invention, the tiebar is joined to the outer end of each first foot by a loop, the tiebar being offset towards the second feet relative to the first feet.

In this way, when the calliper is fitted into position, the tiebar, bearing against the upper edge of the pads, is forced angularly towards the hoops in coming to bear against an angle defined on the upper edge of the pads by a central projection on the latter so as to push the pads elastically, radially and tangentially at the same time.

Yet another object of the present invention is to propose a disc brake of the type mentioned above arranged to be equipped with a pad spring according to the invention and enabling the spring to be fitted into position on the calliper from the outside.

For this purpose, according to another feature of the invention, the opening passing through the calliper arch, seen from above, takes the form of a passage of small dimensions of an essentially rectangular profile with two opposite end windows for the first and second feet of the two hoops to pass through, outlining, internally, lateral seats formed in the inside face of the calliper arch.

Other features and advantages of the present invention will emerge from the following description of embodiments, given by way of illustration but not in any way, limiting, with reference to the accompanying drawings, in which.

In the Figures and in the description below, identical or similar components are referred to by the same reference numbers.

Figure 1:
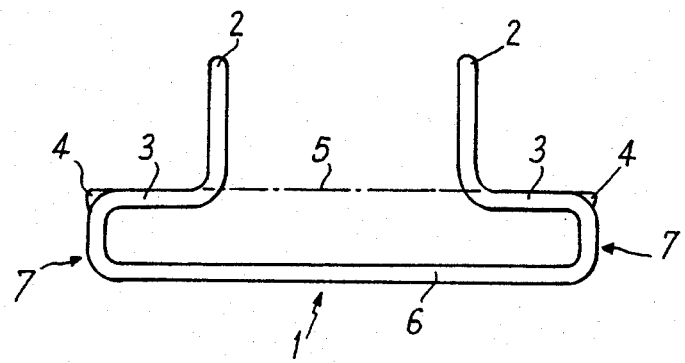
FIGS. 1 to 3 are different views of a spring according to the invention.
Figure 2:
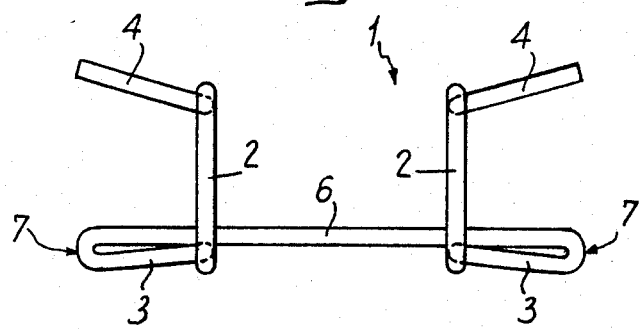
Figure 3:
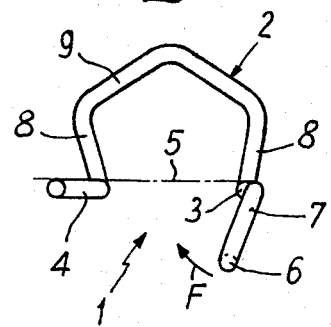

As shown in the figures, the spring 1 according to the invention, made from steel spring wire, advantageously stainless, of 1.5 mm diameter for example, incorporates a central mounting portion consisting of two identical hoops 2, in the general shape of a letter C, the ends of each hoop being extended by first feet 3 and second feet 4 respectively, the feet of each hoop extending in the same direction, opposite the other hoop. As may be seen in FIG. 3, the different feet have upper generating lines which are essentially coplanar in a plane of contact 5. The first feet 3 extend essentially perpendicular to the planes of the hoops 2 while the second branches 4 extend along an angle diverging the ends of these second branches away from the adjacent first branches, beyond the maximum lateral extension of the corresponding hoop halves. The extension outwards of the first and second branches is essentially identical, as may be seen in FIGS. 1 and 2. The outer ends of the first branches 3 are joined to one another by a tiebar 6 which is essentially rectilinear, perpendicular to the planes of the hoops 2. The connection between the tiebar 6 and the outer ends of the first branches 3 is made by means of loops 7, the tiebar 6, extending thus at a distance from the first branches 3 away from the hoops 2, thus providing the elasticity in bending required for the active portion of the spring 1. More specifically, in the example shown, each hoop 2 has two end portions 8 which are essentially symmetrical, straight, and converge towards one another from the central arc portion 9 of the hoop.

Figure 4:
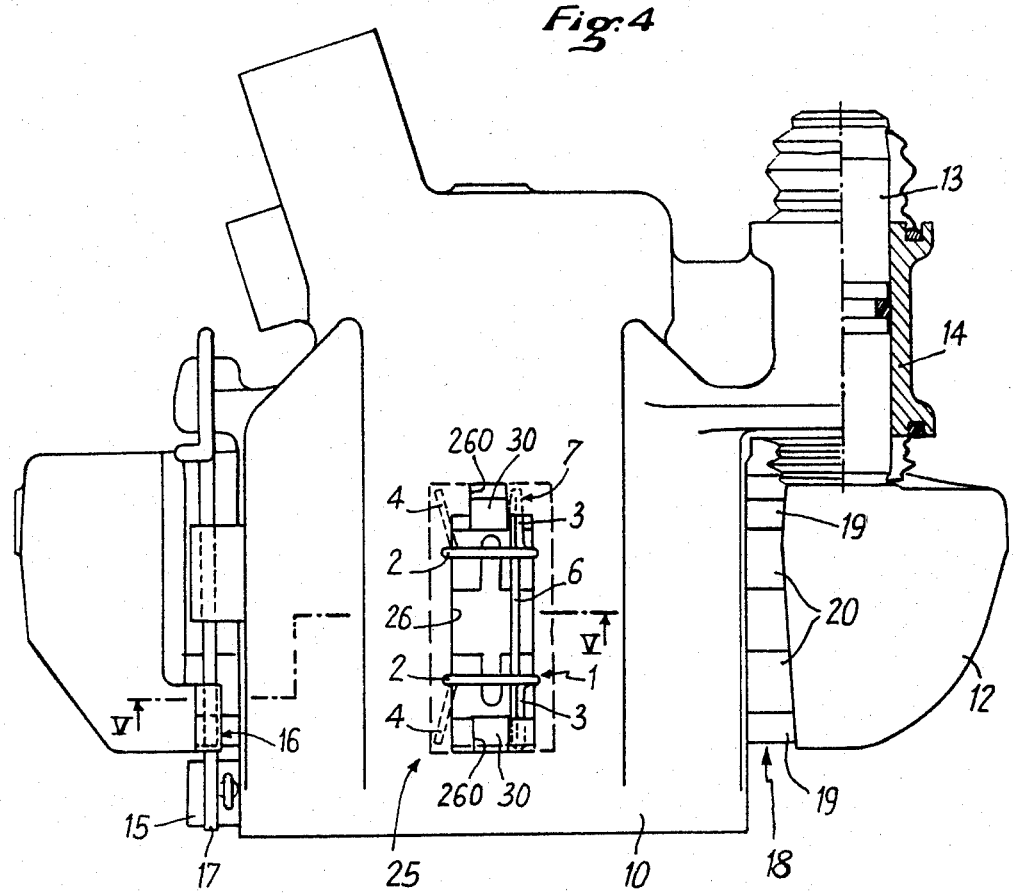
FIG. 4 is a plan view of a brake according to the invention equipped with a spring according to FIGS. 1 to 3.
Figure 5:
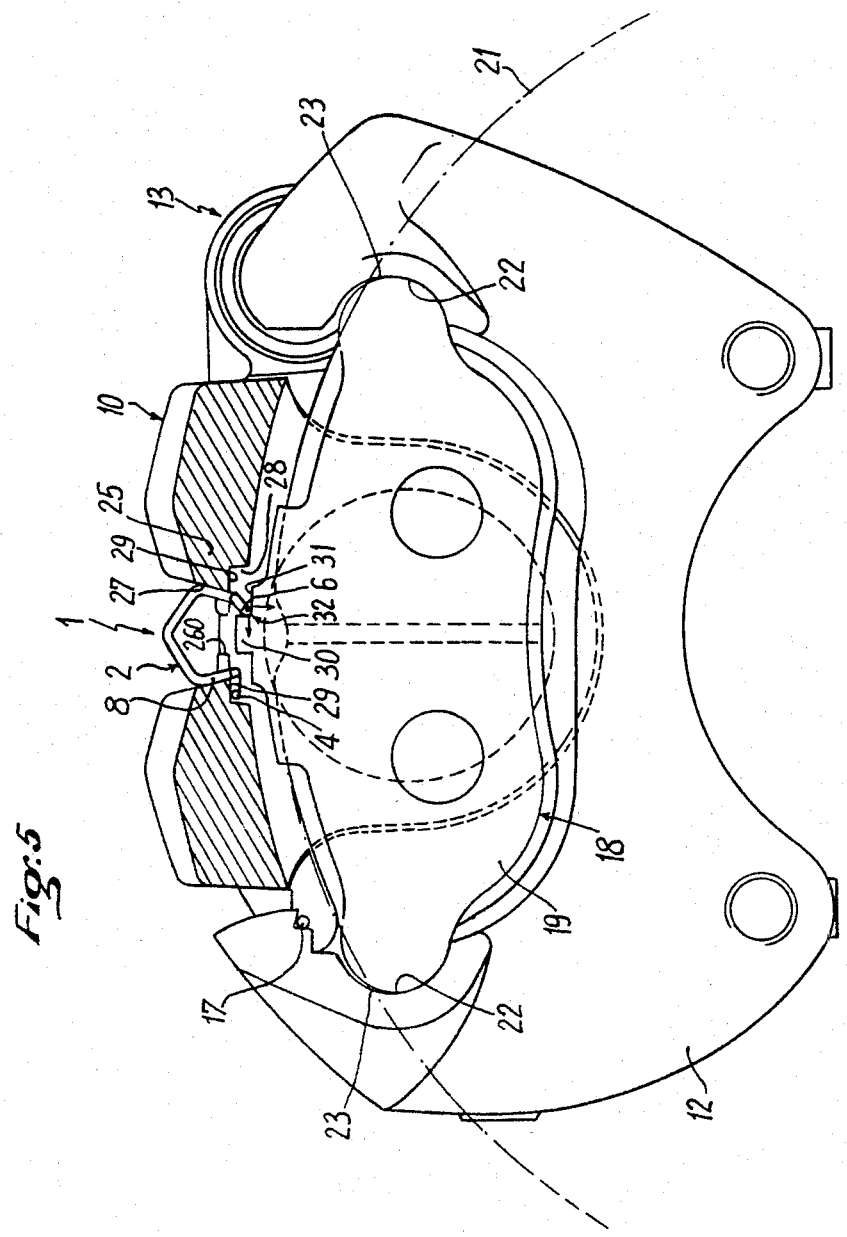
FIG. 5 is a section along the line V—V in FIG. 4.

FIGS. 4 and 5 show a disc brake of the "single pillar" type, consisting of a calliper 10 sliding on a fixed support 12 by means of an axial pin 13, fixed, in the example shown, to the fixed support 12 and housed in a tubular sleeve 14 firmly fixed to the calliper 10. The sliding of the calliper 10 relative to the fixed support 12 is also provided, at the end of the calliper opposite the pin 13, by axial slide surfaces 15 and 16 formed on this opposite end of the calliper and on the adjacent part of the fixed support 12, respectively, and between which is interposed a locking component 17 made of metallic wire according to an arrangement which is the subject of European Patent Application No. 0,036,368 whose content is integrated here for reference. The brake incorporates two friction pads 18, consisting of a support plate 19 and a friction lining 20, capable of coming into frictional engagement with a rotating disc 21 upon actuation of the hydraulic brake motor housed within the calliper 10. The support plates 19 of the friction pads 18 are anchored and allowed to slide by profiled end feet 22 in corresponding openings 23 formed in the fixed support 12 according to an arrangement described in European Patent Application No. 0,002,399, that is to say, in an arrangement where it is desirable to exert a tangential force on the friction pads which maintains the latter in a preferred lateral position bearing against the fixed support 12.

The calliper 10 incorporates an arched portion 25 vertically above the disc and the middle zones of the pads 18 and provided with an opening passing through, defined by lateral edges 27 parallel to the axis of the disc 21 and converging towards the axis of the disc 21 so as to form a passage 26, which is essentially rectangular of small dimensions, whose opposite ends, towards the axis of the disc, are extended by rectangular windows 260. In the inside face of the arch 25 a hollow 28 is formed, of essentially rectangular shape, extending laterally, in the circumferential direction of disc rotation, from the passage 26 of small dimensions and within which are formed the windows 260 so as to define laterally, either side of each of these windows, a recessed seat 29. As may be seen more clearly in FIG. 5, the support plate 19 of each pad 18 is provided centrally with a protuberance 30 which projects outwards relative to the upper edge 31 of the adjacent middle zone of the support plate, so as to define an angled seat 32 intended to accept the tiebar 6 as is explained in detail below.

To be fitted in position in the arch 25 of the calliper 10, the spring 1 is introduced from above into the opening in the arch by forcing the first and second feet 3 and 4 elastically towards one another by elastic deformation of the central arc portion 9 of the hoops 2 so as to allow these feet to pass into the end windows 260 until they reach the angle between these windows and the recessed seats 29 of the hollow 28, the feet then being permitted to spread away from one another so as to tend to recover their initial position in space, this spreading being limited by the lateral generatrices of the end portions 8 of the hoops 2 coming into contact against the opposing faces 27 of the opening in the arch, the first and second feet 3 and 4 being maintained relative to one another bearing against the internal seats 29 of the hollow 28. When the calliper 10 is pivoted towards its normal locked operating position relative to the fixed support 12, the assembly of the spring 1 applying force, made up of the tiebar 6 and its two end connecting loops 7, which until now occupied its natural position shown in FIG. 3, comes to bear, through the tiebar 6, against the upper edge 31 of the lining support plates 19. Due to the initial inclination of this assembly applying force, the latter is brought, when the calliper is approached towards the upper edges of the friction pads, to hinge in sliding contact against the upper edge 31, in the direction of the arrow F, about the axis consisting of the first branches 3, until the tiebar 6 comes into abutment aginst the lateral edge of the central projecting portion 30 of the lining support plate 19, thus becoming trapped in the angled seat 32. The remainder of the pivoting of the calliper 10 in its normal operating position locked onto the fixed support 12 then results in a slight crushing of the spring assembly applying force, whose bending is permitted by the end connecting loops 7. In the operating position thus attained, shown in FIG. 5, the tiebar 6 thus exerts a pushing force on the friction pads which includes a radial component and a tangential component, as indicated by the small arrows in FIG. 5. Due to the radial component of force, the calliper 10 is itself pushed elastically outwards by reaction, which thus ensures that the axial slide surfaces of the calliper and of the fixed support 12 are maintained in contact. It will be observed that, in the normal operating position, the zones of the spring 1 under stress are positioned away from the source of radiant heat constituted by the disc 21, and that the spring assembly 1 is correctly ventilated and only obscures the inspection zone of the pads to a very limited degree.

Figure 6:
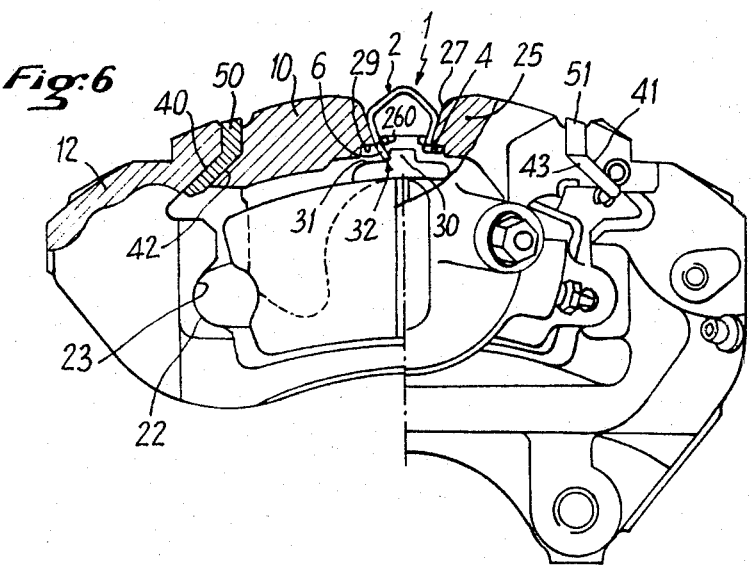
FIG. 6 is a view, partially sectioned, of another type of disc brake according to the invention, equipped with the spring shown in FIGS. 1 to 3.

Another type of brake is shown in FIG. 6 equipped with a spring 1 according to the present invention, identical, as far as it is concerned, with that described above with reference to FIGS. 1 to 5. The configurations of the friction pads 18 and of the calliper arch 25 are also identical to those described above.

The brake shown in FIG. 6, of the type described in European Patent Application No. 0,002,399, differs from the brake shown in FIGS. 4 and 5 in that the calliper 10 is here mounted so as to slide relative to the fixed support 12 by means of two pairs of complementary slide surfaces 40, 41 and 42, 43 formed on the fixed support 12 and on the calliper 10 respectively, slide keys 50 and 51 being interposed between the said slide surfaces 40, 41 and 42, 43 respectively. The spring 1 thus maintains the axial slide surfaces of the calliper and of the fixed support in contact and exerts, on the friction pads, the twofold force mentioned above. It is also observed that, owing to the use of the spring 1, the two calliper springs and the two friction pad springs generally used in this type of brake can be eliminated.

Although the present invention has been described in relation to particular embodiments, it is not limited by them, but on the contrary is capable of modifications and variants which will be apparent to a person skilled in the art. In particular, the spring according to the invention may also be applied to brake models in which the friction plates cooperate with lateral edges of the portion of the calliper arch by means of slide pins. The shape of the hoops 2 may also be adapted for certain particular configurations of openings passing through calliper arches.

We claim:

1. A spring for a disc brake of the type comprising a calliper mounted so as to slide on a fixed support, and incorporating an arch portion having, vertically above the two friction brake pads, an opening passing through, the spring being intended to be interposed between the arch portion of the calliper and the friction pads so as to exert on the latter at least a radial force directed essentially towards the axis of the disc and consisting of a central portion arranged to be entered into the opening in the arch portion, extended by lateral portions capable of cooperating with an inner face of the arch for elastic mounting on the calliper, and a bearing portion cooperating, in the operating position of the brake, with adjacent upper edges of the friction pads, characterized in that the spring is shaped to take the form of two parallel hoops each essentially in the shape of a letter C, constituting said central portion, each hoop having end zones extended by first and second feet, respectively, folded angularly in the same direction relative to the plane of the hoop, the feet of the two hoops extending in opposite directions and constituting said lateral portions, the first feet of the hoops being joined to one another by a tiebar extending perpendicular to the plane of the hoops and constituting said bearing portion.

2. The spring according to claim 1, characterized in that it is made from a steel wire.

3. The spring according to claim 1 characterized in that the tiebar is joined to the outer end of each first foot by a loop.

4. The spring according to claim 3, characterized in that the tiebar is normally offset towards the second feet relative to the first feet.

5. The spring according to claim 1, characterized in that the first feet and the tiebar are essentially coplanar.

6. The spring according to claim 1, characterized in that the tiebar is rectilinear.

7. The spring according to claim 1, characterized in that the extensions of the first and second feet are essentially identical.

8. The spring according to claim 1, characterized in that each hoop has two straight end zones essentially symmetrical and converging towards one another from a central arc portion.

9. The spring according to claim 1, characterized in that the second feet diverge angularly from the first feet.

10. A disc brake having the spring according to claim 1, and of the type having the calliper mounted to slide on the fixed support and the arch portion having the opening passing through vertically above the two friction pads of the brake, characterized in that the opening in the arch is in the form of a passage having small dimensions and a rectangular profile with two opposite end windows for the first and second feet of the two parallel hoops to pass through, and the opening outlining lateral seats formed in the inner face of the arch portion.

11. The disc brake according to claim 10, characterized in that the lateral seats are formed in a hollow recessed into the arch.

12. The disc brake according to claim 10, characterized in that the friction pads incorporate a central projection forming laterally an angled seat for the tiebar of the spring.

13. The disc brake according to claim 12, characterized in that the calliper is mounted so as to slide axially on the fixed support by means of a single axial pillar and two axial sliding surfaces formed on a portion of the calliper opposite the pillar and on an adjacent portion of the fixed support, respectively.

* * * * *